United States Patent
Yazdi

(10) Patent No.: US 8,056,413 B2
(45) Date of Patent: Nov. 15, 2011

(54) SENSOR AND SENSING METHOD UTILIZING SYMMETRICAL DIFFERENTIAL READOUT

(75) Inventor: Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 497 days.

(21) Appl. No.: 12/208,402

(22) Filed: Sep. 11, 2008

(65) Prior Publication Data
US 2009/0064782 A1    Mar. 12, 2009

Related U.S. Application Data

(60) Provisional application No. 60/993,290, filed on Sep. 11, 2007.

(51) Int. Cl.
*G01P 9/04* (2006.01)
(52) U.S. Cl. ..................... 73/504.13
(58) Field of Classification Search ............ 73/504.13, 73/504.12, 504.14, 504.16, 504.04
See application file for complete search history.

(56) References Cited

U.S. PATENT DOCUMENTS

| | | | | |
|---|---|---|---|---|
| 5,383,362 A * | 1/1995 | Putty et al. | ................. | 73/504.01 |
| 5,629,472 A * | 5/1997 | Varnham et al. | ............... | 73/1.37 |
| 5,850,041 A * | 12/1998 | Kumar et al. | ............... | 73/504.12 |
| 6,079,270 A * | 6/2000 | Matthews et al. | .......... | 73/504.02 |
| 6,128,954 A * | 10/2000 | Jiang | .......................... | 73/504.13 |
| 6,151,964 A * | 11/2000 | Nakajima | .................. | 73/504.13 |
| 6,276,205 B1 * | 8/2001 | McNie et al. | ............... | 73/504.13 |
| 6,539,804 B1 * | 4/2003 | Iwata | ........................ | 73/504.13 |
| 6,848,305 B2 * | 2/2005 | Fell et al. | .................... | 73/504.13 |
| 7,093,488 B2 * | 8/2006 | Ragot et al. | ..................... | 73/510 |
| 7,155,978 B2 * | 1/2007 | Lo et al. | ..................... | 73/504.13 |
| 7,360,423 B2 * | 4/2008 | Ayazi et al. | ................ | 73/504.12 |
| 7,621,184 B2 * | 11/2009 | Caron | ........................ | 73/504.13 |

\* cited by examiner

*Primary Examiner* — Helen C. Kwok
(74) *Attorney, Agent, or Firm* — Hartman & Hartman, P.C.; Gary M. Hartman; Domenica N. S. Hartman

(57) ABSTRACT

A sensor and sensing method capable of full-differential symmetry to minimize bias drift and improve stability of the sensor output. The sensor includes a sensing element, sense electrodes capacitively coupled to the sensing element to generate capacitive outputs that vary in response to the motion of the sensing element, and a differential readout device. The sense electrodes are electrically separable into at least two pairs of differential sense electrodes. The readout device performs a sampling sequence of at least two sampling cycles during which the readout device samples the capacitive outputs of the sense electrodes and produces at least two differential outputs based on the difference between the capacitive outputs within each pair of differential sense electrodes. The readout device then calculates an average of the differential outputs of the sampling sequence to produce an output of the differential readout device, and thereafter repeats the sampling sequence and calculation.

21 Claims, 2 Drawing Sheets

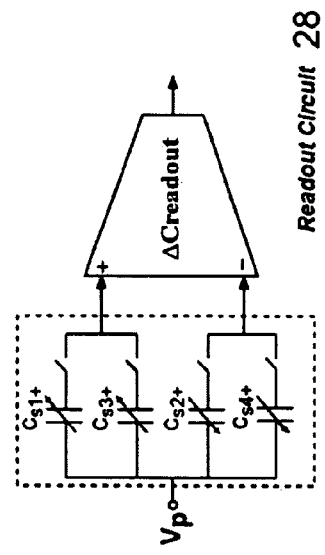
FIG. 3
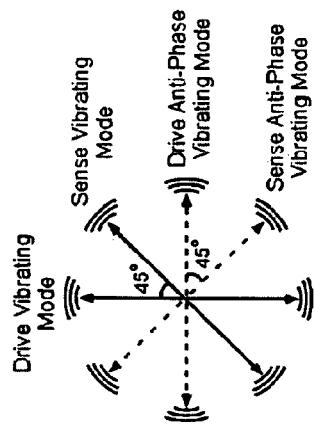
FIG. 5
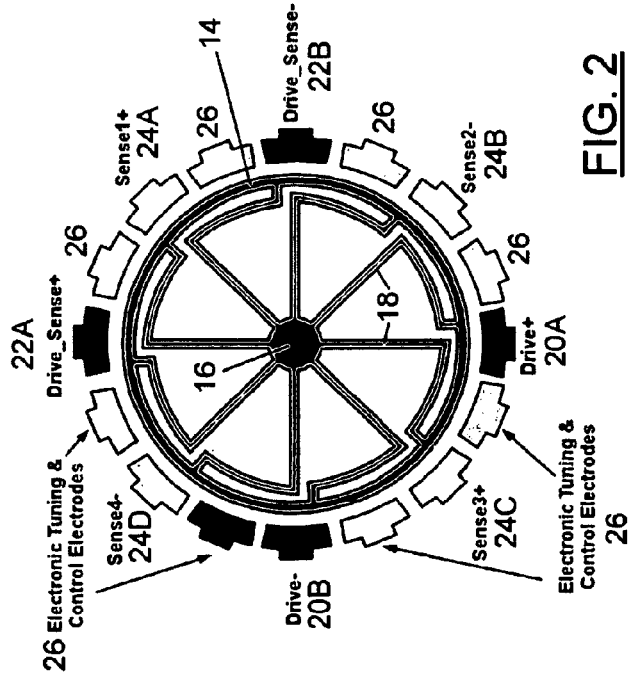
FIG. 2
FIG. 4

SENSOR AND SENSING METHOD UTILIZING SYMMETRICAL DIFFERENTIAL READOUT

CROSS REFERENCE TO RELATED APPLICATIONS

This application claims the benefit of U.S. Provisional Application No. 60/993,290, filed Sep. 11, 2007, the contents of which are incorporated herein by reference.

BACKGROUND OF THE INVENTION

The present invention generally relates to sensors equipped with sensing elements that respond with motion to an environmental input, such as angular and linear motion. More particularly, this invention relates to sensors and sensing methods utilizing capacitive sensing and a differential readout capable of effectively achieving full-differential symmetry at the output of the readout.

Vibratory structures and other structures that operate on the basis of the Coriolis effect are commonly used in MEMS (microelectromechanical systems) gyroscopes due to their compatibility with microfabrication, ease of drive and sense, better scalability, and lower power requirements. The resolution of almost all micro-gyroscopes is limited by the thermomechanical (Brownian noise) of the sense structure. The noise floor can be reduced by increasing the sensor mass, quality factor (Q), amplitude of vibration, and the resonant frequency. Relative to other sensing schemes, capacitive sensing schemes are widely used for sensing resonant gyroscopes due to their ability to employ relatively uncomplicated structures, achieve high sensitivities, and exhibit low temperature drift. Micro-ring and other resonating structures have been designed to have four-quadrant structural symmetry. However, their readouts, even if operating in a differential mode, have been limited to two-quadrant symmetry.

BRIEF DESCRIPTION OF THE INVENTION

The present invention provides a sensor that operates with a differential readout device whose output achieves full-differential symmetry, thereby minimizing bias drift and improving stability of the sensor output.

According to a first aspect of the invention, the sensor includes a sensing element that responds with motion to an environmental input, a plurality of sense electrodes capacitively coupled to the sensing element to generate a corresponding plurality of capacitive outputs that vary in response to the motion of the sensing element, and a differential readout device. The sense electrodes are electrically separable into at least two pairs of differential sense electrodes. The differential readout device performs a sampling sequence comprising at least two sampling cycles during which the readout device samples the capacitive outputs of the sense electrodes and produces at least two differential outputs based on the difference between the capacitive outputs within each pair of the differential sense electrodes. The differential readout device then calculates an average of the at least two differential outputs of the sampling sequence to produce an output of the differential readout device, and thereafter repeats the sampling sequence and calculating steps.

According to a second aspect of the invention, a sensing method is provided that is performed with the sensor. The method entails operating the differential readout device to perform the sampling sequence comprising at least two sampling cycles during which the readout device samples the capacitive outputs of the sense electrodes and produces at least two differential outputs based on the difference between the capacitive outputs within each pair of the differential sense electrodes, calculates an average of the at least two differential outputs of the sampling sequence to produce an output of the differential readout device, and then repeats the sampling sequence and calculating steps.

In preferred embodiments of the invention, the sensor may be a micro-gyroscope and have four-quadrant structural symmetry, and the differential readout device is capable of four-quadrant full-differential symmetry by dynamically switching at least four pairs of differential sense electrodes at a high sampling rate around the symmetrical mechanical structure of the gyroscope. The output of the readout device is obtained by averaging the output of all the sampled differential pairs in a cycle that encompasses all four quadrants of the mechanical structure. Potential advantages of such a sampling scheme include higher device stability, immunity to electrical noise and spurious mechanical input, and lower offset (bias) drift. Lower bias drift and overall output stability are key performance factors in gyroscope applications, particularly for inertial navigation.

Other objects and advantages of this invention will be better appreciated from the following detailed description.

BRIEF DESCRIPTION OF THE DRAWINGS

FIG. 2 schematically represents the location of drive electrodes and sense electrodes of the gyroscope of FIG. 1, and the arrangement of the sense electrodes as differential capacitor pairs.

FIG. 3 represents a scheme in which the sense electrodes of FIG. 2 are dynamically switched in four quadrants.

FIG. 4 is a chart depicting four consecutive and repeating readout cycles obtained by dynamically switching the four quadrants of the sense electrodes represented in FIG. 3.

FIG. 5 schematically represents a differential readout circuit for averaging the four consecutive capacitance readout cycles to produce an output of the readout circuit.

DETAILED DESCRIPTION OF THE INVENTION

Figure 1:
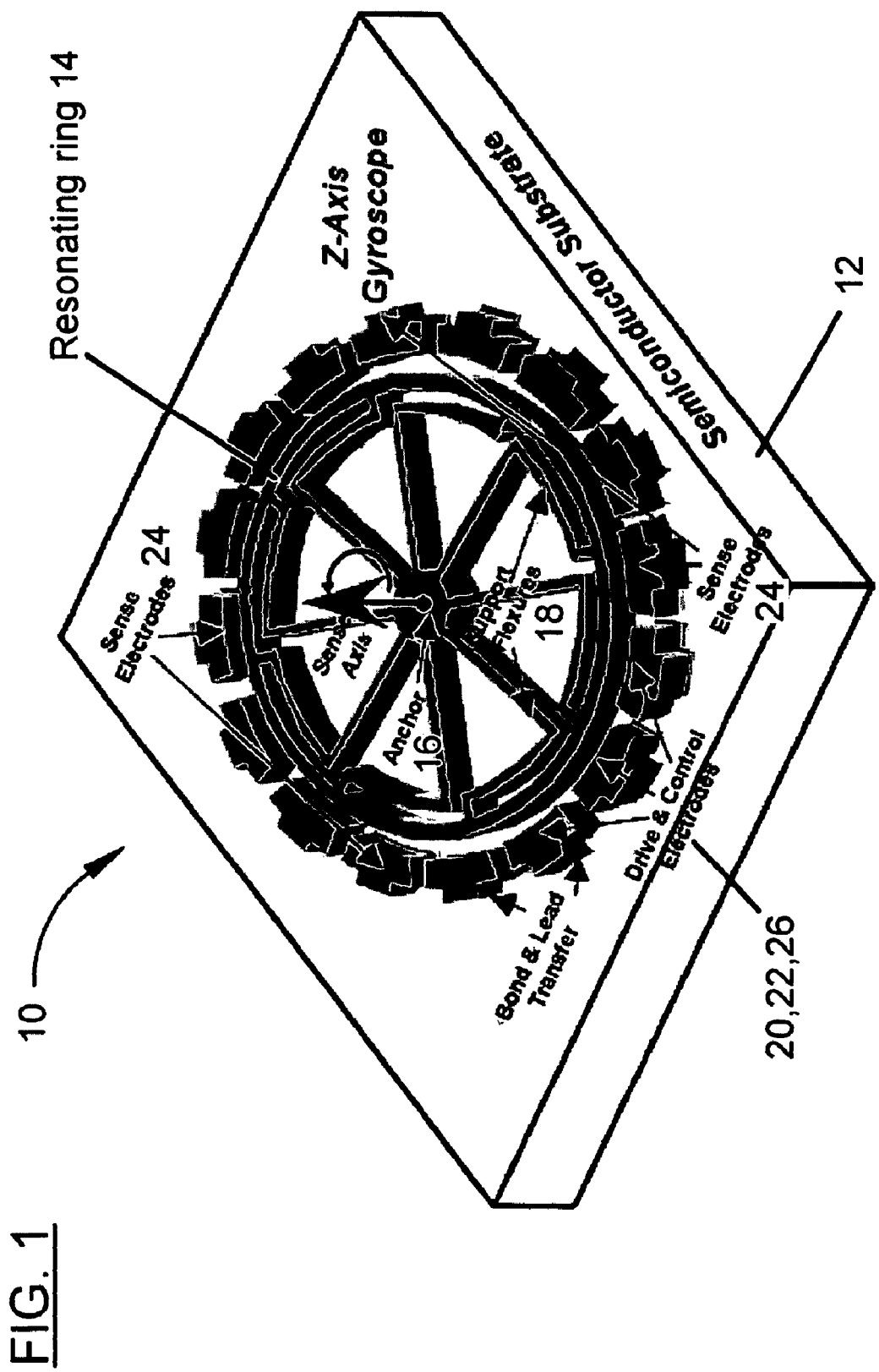
FIG. 1 schematically represents a perspective view of a vibratory ring micro-gyroscope having four-quadrant structural symmetry in accordance with an embodiment of this invention.

FIG. 1 schematically represents a preferred embodiment of a z-axis micro-gyroscope 10 fabricated as a MEMS device on a substrate 12, for example a semiconductor wafer such as silicon (including CMOS silicon), a non-semiconductive wafer such as glass, etc. The gyroscope 10 comprises a resonating ring 14 supported from a central hub or anchor 16 by support flexures 18, all of which are formed on the substrate 12. The ring 14 is fully symmetrical about the axis of the anchor 16, and therefore less sensitive to spurious vibrations.

The ring 14 is surrounded by a number of equi-angularly spaced electrodes 20, 22, 24 and 26 formed on the substrate 12 in close proximity to the perimeter of the ring 14. The ring 14 is electrically conductive and capacitively coupled with electrodes 20, 22, 24 and 26. As represented in FIG. 2, the electrodes 20, 22, 24 and 26 are fabricated to define a pair of drive electrodes 20A and 20B, a pair of drive-sense electrodes 22A and 22B, four sense electrodes 24A, 24B, 24C and 24D, and eight electronic tuning and control electrodes 26. The drive and drive-sense electrodes 20A and 22A are diametrically opposite each other, as are the drive and drive-sense electrodes 20B and 22B, the sense electrodes 24A and 24C, and the sense electrodes 24B and 24D. In addition, each electronic tuning and control electrode 26 is diametrically opposite from another electronic tuning and control electrode 26.

As with other z-axis vibrating ring gyroscopes, the ring 14 is intended to be electrostatically vibrated into an in-plane elliptically-shaped primary flexural mode with a fixed amplitude. In the embodiment of FIGS. 1 and 2, the fully symmetrical ring 14 has two identical elliptically-shaped primary and secondary flexural modes that have equal natural frequencies, but are oriented forty-five degrees apart from each other. The ring 14 is capable of being electrostatically vibrated into the primary flexural mode with the drive electrodes 20A and 20B and drive-sense electrodes 22A and 22B. The drive electrode 22A is paired with its anti-phase drive electrode 20B, and the drive-sense electrode 22A is paired with its anti-phase drive-sense electrode 22B. The ring 14 is electrostatically driven with the drive electrodes 20A and 20B into its first or primary vibration mode with fixed amplitude at a resonant frequency of the ring 14, causing the ring 14 to acquire the elliptical shape of the first flexural mode. Only tangential deflection of the ring 14 occurs at nodes (i.e., radial motion is zero), while only radial deflection occurs at the antinodes (i.e., tangential motion is zero). In an ideal ring, the nodes and antinodes are spaced forty-five degrees apart.

In FIGS. 1 and 2, the sense electrodes 24A-D are angularly spaced forty-five degrees apart from the drive electrodes 20A and 20B at nodes of the ring 14 to capacitively sense the radial and tangential motion of the ring 14. If the resonating ring 14 is not subject to any rotation, capacitance between the ring 14 and the sense electrodes 24A-D next to the nodes will not change since there is no radial motion at the nodes in the first flexural mode, and therefore no rate signal. However, if the resonating ring 14 is subjected to rotary motion, or angular rate, about the axis of its anchor 16 (z-axis), Coriolis forces transfer energy from the primary flexural mode (drive vibratory mode) to the second flexural mode (sense vibratory mode), which is degenerative from the primary flexural mode and located forty-five degrees apart from the first flexural mode, as represented in FIG. 3. This transfer causes amplitude to build up in the sense vibratory mode proportional to the rotation rate, which can then be capacitively detected with the sense electrodes 24A-D, which capacitively sense the proximity of the ring 14. The tuning and control electrodes 26 can be energized to balance the resonant peaks of the flexural movement of the ring 14 by, for example, changing the electromechanical stiffness of the ring 14 and/or its support flexures 16, which effectively serve as springs that enable the ring 14 to have an axis of rotation at the anchor 16.

According to the present invention, a fully differential readout is achieved with the fully symmetrical ring 14 by detecting the capacitance change at sense electrodes 24A-D located ninety degrees apart from each other and paired as sense mode and anti-phase sense mode electrodes. In FIGS. 1 and 2, the sense electrode 24A is paired with its anti-phase sense electrode 24B, and the sense electrode 24C is paired with its anti-phase sense electrode 24D. The two identical flexural modes of the ring 14 result in amplification of the sensitivity by the quality factor and less temperature sensitivity. Any frequency mismatch due to mass or stiffness asymmetries that occurs during fabrication process can be electronically compensated by use of the tuning and control electrodes 26 located around the ring 14.

The full-symmetry of the ring 14 in four quadrants inherently reduces any bias drift due to stresses induced by the substrate 12, packaging (not shown), and other extrinsic or intrinsic sources. These effects can cause slight variations in the radius of curvature of the substrate 12, which often appears as bias drift in MEMS inertial sensors. In the ring gyroscope 10 of FIGS. 1 and 2, such drifts could be cancelled as a common mode signal provided that the capacitance change is differentially detected in a four-quadrant symmetry. In the present invention, such full symmetry is dynamically implemented to enable reaching the bias stability that is required for navigation grade performance. The additional bias stability that can be achieved with the present invention is also desirable for gyroscopes with lower performance requirements in other applications as well, such as consumer electronics, gaming, motion control, automotive, etc.

In FIG. 2, the capacitive outputs of the sense electrodes 24A-D are used by a readout circuit 28 to produce an electrical output signal, as schematically represented in FIG. 5. A known technique is to employ a differential readout circuit that converts the difference in capacitance of two differential inputs from two capacitive sense electrodes to an output electrical signal. Differential readout techniques provide higher sensitivity and better immunity to noise and cross-coupling at the input. Similarly, a preferred technique for higher performance capacitive sensors is to configure them as differential sense capacitor pairs, where the capacitive output of one of the sense capacitor pairs of a differential pair increases in response to the sensor input with a given polarity (or direction, sign) as the capacitive output of the other sense capacitor decreases. Conventionally, a pair of sense differential capacitors is connected as inputs to a differential readout circuit.

As represented in FIG. 2, in the present invention the capacitive outputs of the sense electrodes 24A-D are in response to the physical rotation of the ring 14, and serve as the inputs to the readout circuit 28. The sense electrodes 24A-D are electrically separated into pairs to define differential capacitor pairs located about ninety degrees apart from each other around the ring 14. These capacitor pairs are defined by the sense electrodes 24A ("sense1") and 24B ("sense2"), the sense electrodes 24C ("sense3") and 24D ("sense4"), the sense electrodes 24A ("sense1 ") and 24D ("sense4"), and the sense electrodes 24C ("sense3") and 24B ("sense2"). Instead of connecting only a single differential pair as done previously in the prior art, a plurality of the differential capacitor pairs are selected at different readout sample times and at a higher sampling rate, and the output of the circuit 28 is an average to effectively represent the capacitance of all the differential capacitor pairs whose capacitive outputs were sent to the readout circuit 28. By choosing the differential pairs of sense electrodes 24A-D symmetrically placed around the ring 14, a fully four-quadrant symmetry is effectively obtained and represented at the output of the readout circuit 28. This symmetry is referred to herein as being dynamically generated by switching and choosing different pairs at a higher sampling rate at different instances, and then averaging the differences in capacitances of the differential capacitor pairs to produce the output of the readout device 28.

In FIG. 2, the sense electrodes 24A-D across all four quadrants are dynamically switched as the input to the readout circuit 28 of FIG. 5 in four consecutive sampling cycles shown in FIG. 4. In each sampling cycle, switches (FIG. 5) individually coupled in series with each sense electrode 24A-D are operated to electrically separate the sense electrodes 24A-D into differential pairs. Specifically, the switches are operated to perform a sequence of sampling cycles, during which the capacitive outputs of pairs of the sense electrodes 24A-D are selected and summed in each sampling cycle. In FIG. 4, a sampling sequence is represented as made up of four sampling cycles performed with the gyroscope 10 of FIG. 2, with each sampling cycle yielding a differential output determined by the difference between the capacitive outputs of a differential pair of the sense electrodes 24A-D, namely: the difference between the capacitive outputs (Cs1+ and Cs2+) of electrodes 24A (sense1) and 24B (sense2), respectively, in cycle 1; the difference between the capacitive outputs (Cs3+ and Cs4+) of electrodes 24C (sense3) and 24D (sense4), respectively, in cycle 2; the difference between the capacitive outputs (Cs1+ and Cs4+) of electrodes 24A (sense1) and 24D (sense4), respectively, in cycle 3; and the difference between the capacitive outputs (Cs3+ and Cs2+) of electrodes 24C (sense3) and 24B (sense2), respectively, in cycle 4. The four sampling cycles obtain differential outputs from all four quadrants of the ring 14, and are repeated in each subsequent sequence of sampling cycles. The overall differential readout ($\Delta C_{readout}$) is then obtained by taking the average of the four differential outputs from each sampling sequence. Thus, to obtain an equivalent sensing bandwidth, the sampling rate of each cycle needs to be at least four times faster than would be the case if only one set of differential capacitors were employed for readout. In one embodiment of the invention where the objective is to primarily reduce bias drift, the switching rate of the capacitor differential pairs could be performed at a much lower rate than the sense signal bandwidth (or desired sampling rate) since averaging of the lower switching rate still is higher than the rate of change of bias (offset drift), or its effective bandwidth.

In view of the above, the present invention implements a fully symmetrical gyroscope with four quadrant symmetry and differential capacitor readout by utilizing a fully symmetric ring structure, electronically rotating the differential sense electrodes 22A-D in the four symmetric quadrants, and taking their average as the input signal to the differential readout circuit 28. In this scheme, any symmetrical change in the air gap between the ring 14 and the electrodes 24A-D in the X and Y plane of the substrate 12 and ring 14 (in the X and Y axes transverse to the Z axis of the ring 14) due to thermo-mechanical stresses, package-induced stresses, or any other intrinsic or extrinsic sources causing substrate curvature appears as a common mode signal and is cancelled by subtracting the output of the anti-mode electrode from the output of the primary electrode with which it is paired. As a result, such symmetrical changes in the air gap has a near-zero effect on bias drift, and instead results in a finite change of scale factor that can be minimized by using a larger air gap, which is achievable if low-noise and high sensitivity electronics are used in the readout circuit 28.

The capacitive sensing scheme of this invention can be applied to other micro-gyroscopes and sensor structures, with or without the mechanical structural symmetry of the ring 14 in FIGS. 1 and 2 and in any number of samples forming a single readout sampling cycle, provided that all quadrants of the device are covered. As such, the invention is not limited to gyroscopes or sensors with a ring structure. One skilled in the art could use the disclosed scheme to produce better symmetry or lower drift and better bias stability for any sensor with multiple differential sense capacitors that are distributed throughout the sensor structure. This includes various forms of gyroscopes, accelerometers, pressure sensors, strain/stress sensors, displacement sensors, and other types of sensors with sensing elements that respond with motion to an environmental input.

For one skilled in the art it is clear that the scope of this invention extends to situations where exact even numbers of sense capacitors, or matching differential capacitor pairs, are not necessarily present in a sensor structure. By applying different switching schemes, capacitor pairs can be connected as inputs to a differential readout circuit at different times, so that the output of the readout circuit is an average to improve overall output accuracy. As an example, the sensing structure could have three sense electrodes (capacitors), with the output of one sense capacitor (Cse1+) increasing in response to a sensed input in a given direction (or with a given sense input polarity), and the outputs of the remaining two sense capacitors (Cse2−) decreasing in response to the sensed input in the same direction (or polarity). Thus, applying the disclosed scheme entails connecting Cse1+ and Cse2− in one cycle to the input of a readout circuit, and in the other cycle connecting Cse1+ and Cse3− to the readout circuit, and then repeating this sequence of switching the sense capacitors as inputs to the readout circuit, sequentially. This is just a representative example, and many other configurations for various sensors exist that could utilizing the scheme of this invention. Further, the disclosed scheme could apply to situations where several differential sense capacitors with various configurations are present in the sense structure.

In another embodiment of the invention, the switches shown in FIG. 5 as being used to select and electrically separate the sense electrodes 24A-D into differential pairs could be eliminated. Instead the sense electrodes 24A-D can be continuously connected to the differential readout circuit 28 at all times, and their capacitive outputs are summed as (Cs1+ and Cs3+) and (Cs2+ and Cs4+). The differential readout circuit 28 then calculates the difference between the two sums in each sampling cycle.

While the invention has been described in terms of specific embodiments, it is apparent that other forms could be adopted by one skilled in the art. For example, the type and physical configuration of the sensor could differ from that shown, and materials and processes other than those noted could be used. Therefore, the scope of the invention is to be limited only by the following claims.

The invention claimed is:

1. A sensor adapted to achieve differential symmetry at an output thereof, the sensor comprising:
    a sensing element that responds with motion to an environmental input;
    a plurality of sense electrodes capacitively coupled to the sensing element to generate a corresponding plurality of capacitive outputs that vary in response to motion of the sensing element, the sense electrodes being electrically separable into at least two pairs of differential sense electrodes, the differential sense electrodes of each pair detecting motion of the sensing element at different locations of the sensing element;
    differential readout means for performing a sampling sequence comprising at least two sampling cycles during which the differential readout means samples the capacitive outputs of the sense electrodes and produces at least two differential outputs based on the difference between the capacitive outputs within each pair of the differential sense electrodes, calculating an average of the at least two differential outputs of the sampling sequence to produce an output of the differential readout means, and then repeating the sampling sequence and calculation; and
    means for connecting different pairs of the differential sense electrodes at a sampling rate and at instances to achieve dynamically generated symmetry at the output of the differential readout means.

2. The sensor according to claim 1, wherein the connecting means comprises switches individually coupled in series with each of the sense electrodes and operable to electrically separate the sense electrodes into the at least two pairs of differential sense electrodes by connecting and disconnecting the capacitive outputs of the sense electrodes to the differential readout means.

3. The sensor according to claim 1, wherein the sensing element is a symmetrical vibrating ring and the sense electrodes surround the perimeter of the vibrating ring and are capacitively coupled to the vibrating ring.

4. The sensor according to claim 3, wherein the vibrating ring has four symmetrical quadrants, the plurality of sense electrodes comprises four sense electrodes, and a corresponding one of the sense electrodes is located in each of the four symmetrical quadrants of the vibrating ring.

5. The sensor according to claim 4, wherein in each sampling sequence the capacitive outputs from the sense electrodes in each of the four quadrants are sampled.

6. The sensor according to claim 4, wherein the differential readout means samples the capacitive outputs of the sense electrodes to produce a differential output from the difference in the capacitive outputs of a first and second of the sense electrodes, a differential output from the difference in the capacitive outputs of a third and fourth of the sense electrodes, a differential output from the difference in the capacitive outputs of the first and fourth of the sense electrodes, a differential output from the difference in the capacitive outputs of the third and second of the sense electrodes.

7. The sensor according to claim 1, wherein the differential readout means samples the capacitive outputs of the sense electrodes to produce a differential output from the difference in the capacitive outputs of a first and second of the sense electrodes, a differential output from the difference in the capacitive outputs of a third and fourth of the sense electrodes, a differential output from the difference in the capacitive outputs of the first and fourth of the sense electrodes, a differential output from the difference in the capacitive outputs of the third and second of the sense electrodes.

8. The sensor according to claim 1, wherein the sensor has an even number of the sense electrodes.

9. The sensor according to claim 1, wherein the sense electrodes of each pair of differential sense electrodes are diametrically opposite each other relative to the sensing element.

10. The sensor according to claim 1, wherein the sensor has an odd number of the sense electrodes.

11. A sensing method performed with the sensor of claim 1, the method comprising operating the differential readout means to:
perform the sampling sequence comprising at least two sampling cycles during which the differential readout means samples the capacitive outputs of the sense electrodes and produces at least two differential outputs based on the difference between the capacitive outputs within each pair of the differential sense electrodes;
calculate an average of the at least two differential outputs of the sampling sequence to produce an output of the differential readout means, and then
repeat the sampling sequence and calculation;
wherein the sampling sequence performed by the differential readout means comprises operating the connecting means to switch and choose different pairs of the differential sense electrodes at a sampling rate and at instances to achieve dynamically generated symmetry at the output of the differential readout means.

12. The sensing method according to claim 11, wherein the connecting means comprises switches individually coupled in series with each of the sense electrodes and operable to electrically separate the sense electrodes into the at least two pairs of differential sense electrodes by connecting and disconnecting the capacitive outputs of the sense electrodes to the differential readout means.

13. The sensing method according to claim 11, wherein the sensing element is a symmetrical vibrating ring and the sense electrodes surround the perimeter of the vibrating ring and are capacitively coupled to the vibrating ring.

14. The sensing method according to claim 13, wherein the vibrating ring has four symmetrical quadrants, the plurality of sense electrodes comprises four sense electrodes, and one of the sense electrodes is located in each of the four symmetrical quadrants of the vibrating ring.

15. The sensing method according to claim 14, wherein in each sampling sequence the capacitive outputs from sense electrodes in each of the four quadrants are sampled.

16. The sensing method according to claim 14, wherein the differential readout means samples the capacitive outputs of the sense electrodes to produce a differential output from the difference in the capacitive outputs of a first and second of the sense electrodes, a differential output from the difference in the capacitive outputs of a third and fourth of the sense electrodes, a differential output from the difference in the capacitive outputs of the first and fourth of the sense electrodes, a differential output from the difference in the capacitive outputs of the third and second of the sense electrodes.

17. The sensing method according to claim 11, wherein the differential readout means samples the capacitive outputs of the sense electrodes to produce a differential output from the difference in the capacitive outputs of a first and second of the sense electrodes, a differential output from the difference in the capacitive outputs of a third and fourth of the sense electrodes, a differential output from the difference in the capacitive outputs of the first and fourth of the sense electrodes, a differential output from the difference in the capacitive outputs of the third and second of the sense electrodes.

18. The sensing method according to claim 11, wherein the sensor has an even number of the sense electrodes.

19. The sensing method according to claim 11, wherein each pair of differential sense electrodes are diametrically opposite each other relative to the sensing element.

20. The sensing method according to claim 11, wherein the sensor has an odd number of the sense electrodes.

21. A sensor comprising:
a sensing element having flexural modes that respond to an environmental input;
a plurality of sense electrodes capacitively coupled to the sensing element to generate a corresponding plurality of capacitive outputs that vary in response to motion of the sensing element, the sense electrodes being electrically separable into at least two pairs of differential sense electrodes, the differential sense electrodes of each pair detecting motion at nodes of a first flexural mode of the sensing element at different locations of the sensing element;
differential readout means for performing a sampling sequence comprising at least two sampling cycles during which the differential readout means samples the capacitive outputs of the sense electrodes and produces at least two differential outputs based on the difference between the capacitive outputs within each pair of the differential sense electrodes, calculating an average of the at least two differential outputs of the sampling sequence to produce an output of the differential readout means, and then repeating the sampling sequence and calculation; and
means for connecting to different pairs of the differential sense electrodes during each sampling cycle.

* * * * *